(12) United States Patent
Hoagland et al.

(10) Patent No.: US 10,967,427 B2
(45) Date of Patent: Apr. 6, 2021

(54) POWER-OPERATED MOLD CLAMPING SYSTEM FOR EXOTHERMIC REACTION WELDING

(71) Applicant: Hubbell Incorporated, Shelton, CT (US)

(72) Inventors: Timothy Charles Hoagland, Tulsa, OK (US); Xue Chang, Owasso, OK (US); Joshua Dean Mitchell, Broken Arrow, OK (US)

(73) Assignee: Hubbell Incorporated, Shelton, CT (US)

( * ) Notice: Subject to any disclaimer, the term of this patent is extended or adjusted under 35 U.S.C. 154(b) by 744 days.

(21) Appl. No.: 14/638,867

(22) Filed: Mar. 4, 2015

(65) Prior Publication Data

US 2015/0251264 A1  Sep. 10, 2015

Related U.S. Application Data

(60) Provisional application No. 61/948,898, filed on Mar. 6, 2014.

(51) Int. Cl.
*B22D 19/04* (2006.01)
*B23K 37/06* (2006.01)
(Continued)

(52) U.S. Cl.
CPC .............. *B22D 19/04* (2013.01); *B23K 23/00* (2013.01); *B23K 37/06* (2013.01); *B23K 2101/32* (2018.08)

(58) Field of Classification Search
CPC ...... B23K 3/087; B23K 1/0006; B23K 20/26; B23K 37/06; B23K 23/00; B23K 2201/32;
(Continued)

(56) References Cited

U.S. PATENT DOCUMENTS 1,207,601 A * 12/1916 Moudy ................... B26B 17/02
30/187
2,718,680 A * 9/1955 Drill ....................... B22D 29/04
164/407

(Continued)

FOREIGN PATENT DOCUMENTS

EP          355866 A2 *  2/1990
JP        03131489 A  *  6/1991

OTHER PUBLICATIONS

International Search Report and Written Opinion, dated Jun. 29, 2015, in related PCT/US2015/018802.

*Primary Examiner* — Orlando E Aviles
*Assistant Examiner* — Joel D Crandall
(74) *Attorney, Agent, or Firm* — Dickinson Wright PLLC

(57) ABSTRACT

A mold clamping system for exothermic reaction welding adapted to be power-operated by a power device, the combination comprising a first member adapted to support a first mold portion; a second member adapted to support a second mold portion; and a drive mechanism, adapted to be coupled to the power device, coupled to at least one of said first and second members and capable of moving the first and second members between a first position, in which the first and second mold portions are spaced apart, and a second position, in which the first and second mold portions are engaged, upon actuation of the power device in a first and a second direction, respectively.

22 Claims, 10 Drawing Sheets

(51) Int. Cl.
    *B23K 23/00* (2006.01)
    *B23K 101/32* (2006.01)

(58) Field of Classification Search
    CPC .. B22D 19/04; B25B 7/00; B25B 7/12; B25B
        7/123; B25B 5/10; B25B 5/101; B25B
        5/106; B25B 5/108; B25J 15/0009; B25J
        15/0028
    USPC ......... 29/278; 901/31, 32, 38; 269/6, 24–32,
        269/45, 95
    See application file for complete search history.

(56) References Cited

U.S. PATENT DOCUMENTS

| | | | | |
|---|---|---|---|---|
| 2,904,862 A * | 9/1959 | Burke | ................... | B23K 23/00 |
| | | | | 249/105 |
| 2,924,047 A * | 2/1960 | Machovec | ................ | B24B 3/54 |
| | | | | 451/231 |
| 3,004,310 A * | 10/1961 | Burke | ................... | B23K 35/30 |
| | | | | 164/54 |
| 3,043,448 A * | 7/1962 | Melton | ................... | B25J 9/08 |
| | | | | 414/4 |
| 3,063,140 A * | 11/1962 | Lydle | ................... | B25B 27/023 |
| | | | | 29/261 |
| 3,247,978 A * | 4/1966 | Neumeier | ............. | B25J 18/025 |
| | | | | 414/735 |
| 3,304,601 A * | 2/1967 | Torres | ................. | B25B 27/0028 |
| | | | | 29/261 |
| 3,832,119 A * | 8/1974 | Woelk | ................... | B28B 7/0014 |
| | | | | 425/432 |
| D277,165 S * | 1/1985 | DeVroom | ................... | D24/143 |
| 4,728,137 A * | 3/1988 | Hamed | ................ | B25J 15/0266 |
| | | | | 269/228 |
| 4,736,927 A * | 4/1988 | Clancy | ..................... | B25B 1/18 |
| | | | | 254/93 H |
| 4,984,344 A * | 1/1991 | Wells | ................... | B25B 27/023 |
| | | | | 29/261 |
| 5,151,149 A | 9/1992 | Swartz | | |
| 5,253,554 A * | 10/1993 | Riera | ...................... | B25B 7/126 |
| | | | | 29/252 |
| 5,533,662 A * | 7/1996 | Stidham | ................. | B23K 23/00 |
| | | | | 164/341 |
| 5,660,317 A | 8/1997 | Singer et al. | | |
| 5,954,261 A | 9/1999 | Gaman | | |
| 6,079,896 A * | 6/2000 | Dellach | ................... | B25B 5/087 |
| | | | | 269/32 |
| 6,141,862 A * | 11/2000 | Matsui | ................... | F01D 25/285 |
| | | | | 29/278 |
| 6,382,496 B1 * | 5/2002 | Harger | ................... | B23K 23/00 |
| | | | | 228/234.3 |
| D481,402 S * | 10/2003 | Jenkins | ........................ | D15/140 |
| 6,776,386 B1 | 8/2004 | Morrissey et al. | | |
| 6,789,724 B2 | 9/2004 | Cordier et al. | | |
| 6,928,902 B1 * | 8/2005 | Eyssallenne | ............ | B25B 21/00 |
| | | | | 81/57.26 |
| 7,240,717 B2 | 7/2007 | Lofton | | |
| 7,496,999 B2 * | 3/2009 | Robarge | .................. | B25B 13/48 |
| | | | | 29/255 |
| 7,703,358 B2 * | 4/2010 | Ubinana Felix | ........ | E04G 17/04 |
| | | | | 249/219.2 |
| 7,975,900 B2 * | 7/2011 | Lofton | .................. | B22D 19/04 |
| | | | | 228/234.3 |
| 8,439,414 B2 * | 5/2013 | Neeper | .................... | B25J 9/102 |
| | | | | 294/119.1 |
| 8,685,037 B1 * | 4/2014 | Jordan | ............... | A61B 17/8019 |
| | | | | 606/105 |
| D777,547 S * | 1/2017 | Gassner | ........................... | D8/72 |
| 2003/0101568 A1* | 6/2003 | Donovan | ................... | B21J 15/025 |
| | | | | 29/566.1 |
| 2009/0255105 A1* | 10/2009 | Morin | ..................... | B25B 27/02 |
| | | | | 29/426.1 |

* cited by examiner

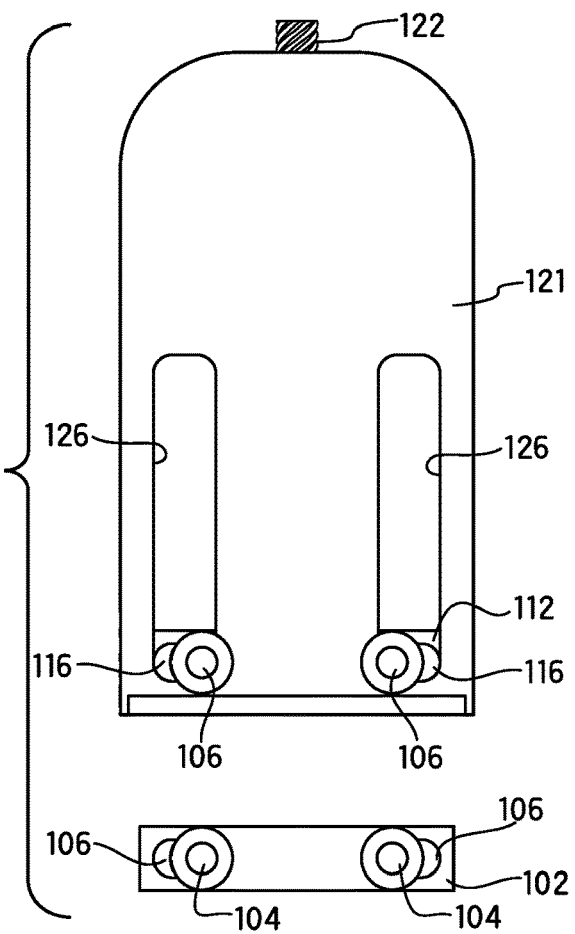
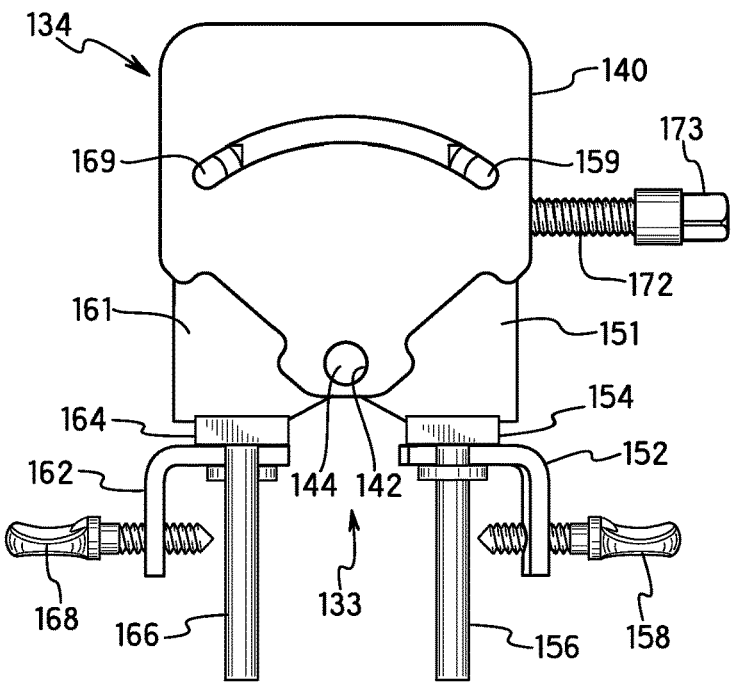
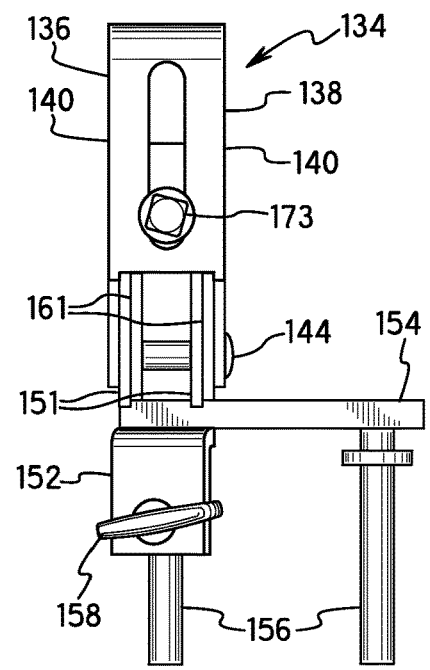

POWER-OPERATED MOLD CLAMPING SYSTEM FOR EXOTHERMIC REACTION WELDING

CROSS-REFERENCE TO RELATED APPLICATION

This application is a non-provisional patent application which is based on U.S. provisional patent application Ser. No. 61/948,898, filed Mar. 6, 2014, the disclosure of which is hereby incorporated herein by reference.

FIELD OF THE INVENTION

The invention relates to clamping devices and tools for handling the components of a mold used for exothermic welding of metallic parts. More particularly, the invention relates to a mold clamping system for exothermic welding adapted to be power-operated by a power device, such as a drill.

BACKGROUND

Exothermic reaction welding is commonly used for joining stranded metal cables to each other and for joining ground rods to other metal parts. A two-piece mold made of graphite, ceramic or other refractory material contains an internal crucible in which a powdered weld mixture is placed after the mold sections are clamped together. The weld mixture typically consists of copper oxide and aluminum. The bottom of the crucible forms a seat for a metal retainer disc that supports the powdered material. Ignition of the powdered material results in an exothermic reaction in the crucible that liquefies the powder, which then melts the metal disc. The molten metal then is free to flow through a tap hole or passageway into a weld cavity that contains the metal parts to be welded. After the weld is completed the mold sections are separated and removed from the weld site, and are then cleaned and prepared for reuse.

The mold sections typically are manually moved relative to each other using handle clamps, which have projecting pins that engage bores in the mold sections and bracket-mounted thumbscrews that tighten the clamps in position. Some clamps have pivoted toggle frames that enable the mold sections to close and open through relative pivotal motion. See, for example, U.S. Pat. No. 5,533,662, the disclosure of which is hereby incorporated herein by reference. Other clamps have mold-engaging portions that close and open the mold sections through relative linear motion. See, for example, U.S. Pat. No. 5,660,317, the disclosure of which is hereby incorporated herein by reference. Other devices used to open and close the mold halves in exothermic reaction welding include U.S. Pat. Nos. 5,954,261; 6,382,496; 6,776,386; 6,789,724; and 7,240,717, the disclosures of which are hereby incorporated herein by reference.

SUMMARY OF THE INVENTION

The mold clamping system of the invention is configured to operate using a powered device to close and open the mold sections. The power source may be electric, hydraulic or pneumatic, or any combination of those, or another suitable source. The powered device may be an integral part of the system or detachable therefrom, and preferably is protected from the heat generated during welding. If the powered device is detachable, the system may include a rotatable shaft configured for releasable engagement by the chuck of a conventional electric drill or other power tool. Use of the power-operated mold clamping system can greatly speed joining various stranded metal cables, which is especially beneficial when numerous welds are performed in the field.

The system may be configured such that one or plural sections of the mold are moved during mold closing and opening. Power transmission to the mold section(s) may be effected through a screw drive, a rack-and-pinion drive, a cable drive, a belt drive, or any other suitable mechanism. The system may have a stationary base and/or a guide, such as a rail or a slide, which controls relative motion of the mold sections. When the mold sections are closed, the system exerts sufficient force on the mold to contain the exothermic reaction.

The system is provided with pins, clamps, thumbscrews, trays, etc. for attaching it to the mold sections. Any section of the mold optionally may be provided with an adjustable attachment for guiding a conductor or other item into place while the mold is closing or opening.

In more detail, the invention of this application relates to a mold clamping system for exothermic reaction welding adapted to be power-operated by a power device, the combination comprising a first member adapted to support a first mold portion; a second member adapted to support a second mold portion; and a drive mechanism, adapted to be coupled to the power device, coupled to at least one of the first and second members and capable of moving the first and second members between a first position, in which the first and second mold portions are spaced apart, and a second position, in which the first and second mold portions are engaged, upon actuation of the power device in a first and a second direction, respectively.

BRIEF DESCRIPTION OF THE DRAWING FIGURES

Preferred embodiments of the disclosed invention are described in detail below, purely by way of example, with reference to the accompanying drawing figures, in which:

FIG. 22 is a front elevational view thereof.

FIG. 23 is a rear elevational view of a fourth embodiment of the mold clamping system of the invention shown in the mold-closed position;

FIG. 24 is a right side elevational view thereof;

DETAILED DESCRIPTION OF THE INVENTION

First Embodiment

FIGS. 1-9

Figure 1:
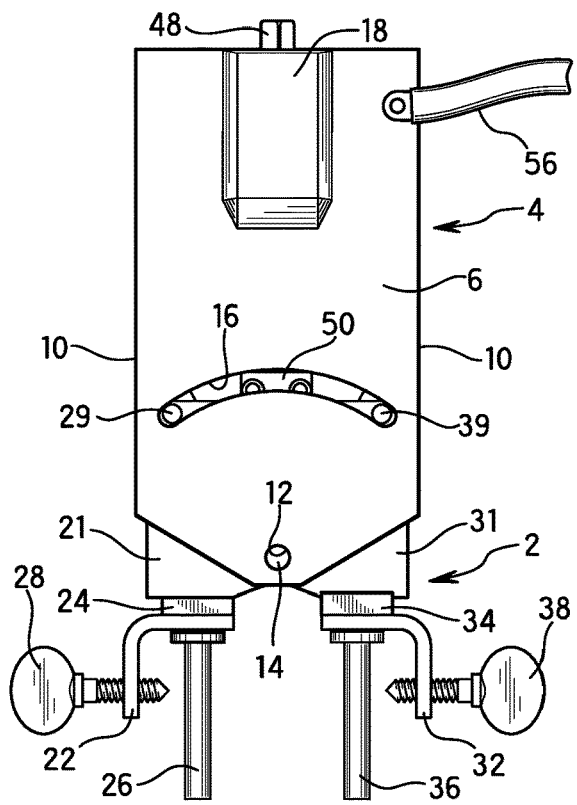
FIG. 1 is a rear elevational view of a first embodiment of the mold clamping system of the invention shown in the mold-closed position.
Figure 2:
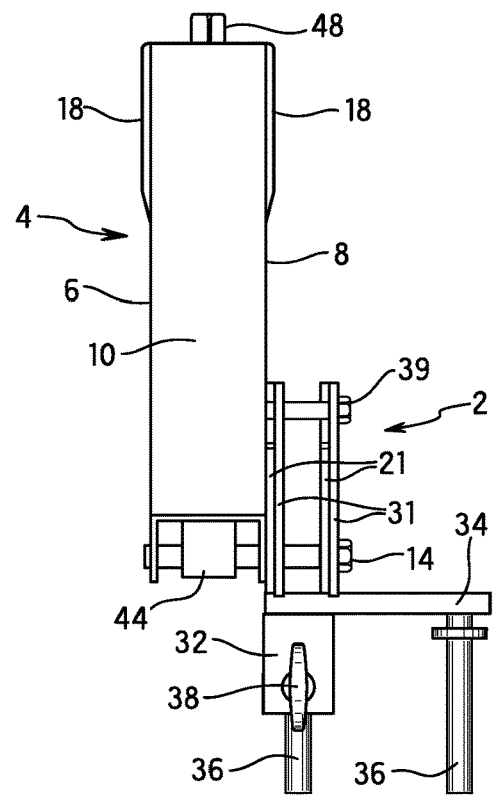
FIG. 2 is a right side elevational view thereof.
Figure 3:
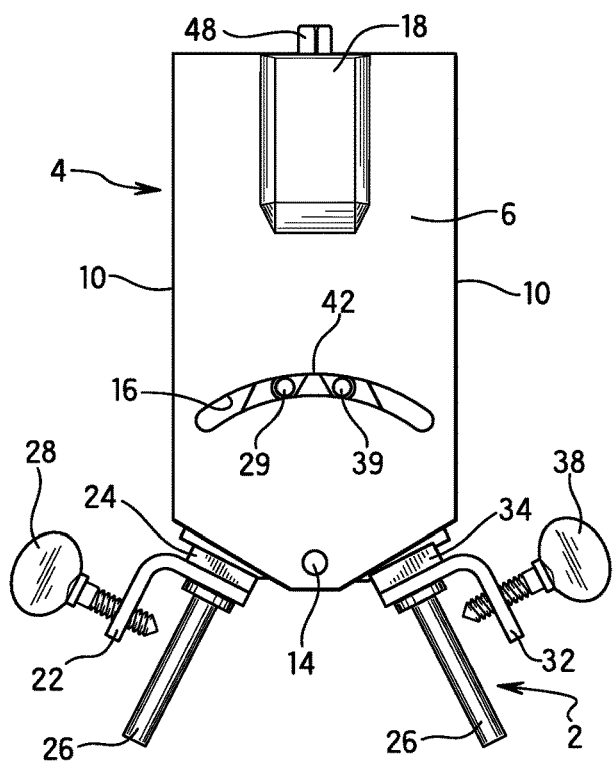
FIG. 3 is a rear elevational view thereof shown in the mold-open position.
Figure 4:
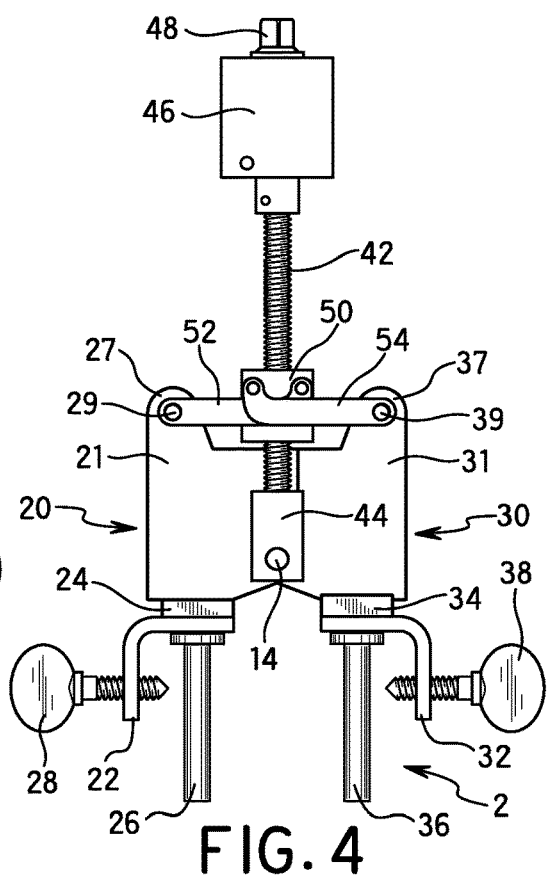
FIG. 4 is a rear elevational view thereof similar to FIG. 1 but shown without its exterior housing.
Figure 5:
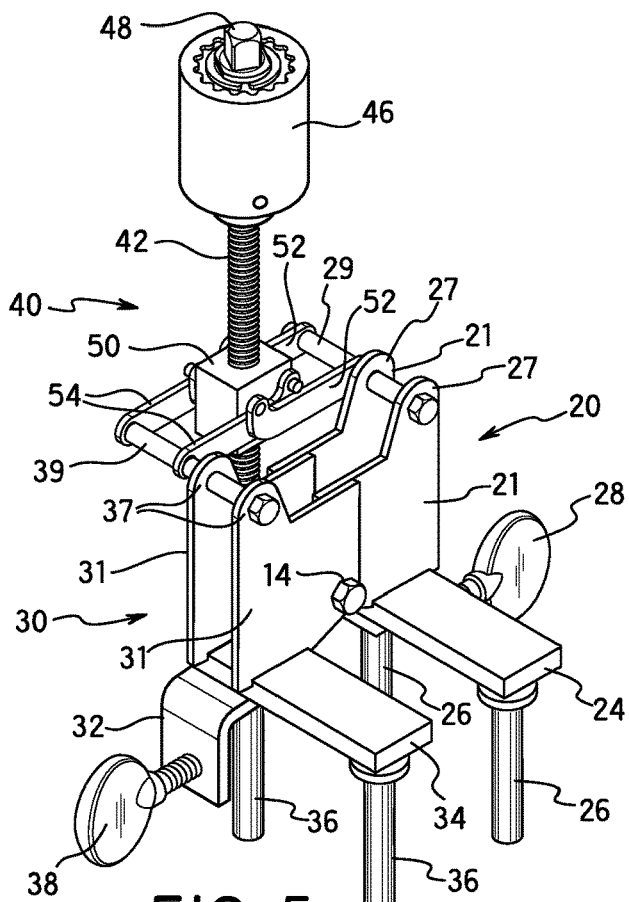
FIG. 5 is a front perspective thereof without the housing and in the mold-closed position.
Figure 6:
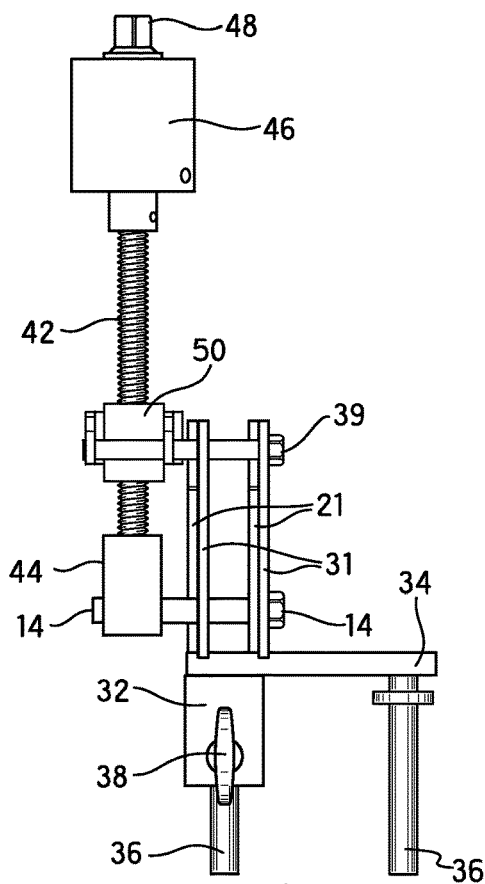
FIG. 6 is a right side elevational view thereof without the housing.
Figure 7:
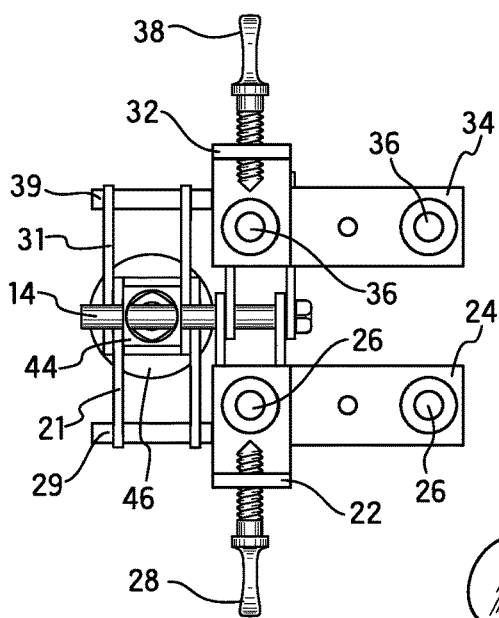
FIG. 7 is a bottom plan view thereof without the housing.

Referring to FIGS. 1-3, a first embodiment of the invention includes a scissor-like mechanism 2, preferably made of steel, high-temperature plastic or other suitable material, which clamps onto two mold sections or portions and pivots them between closed and open positions. Mechanism 2 is disposed outside and supported by a four-sided housing 4, preferably made of steel, high-temperature plastic or other suitable material, having a front wall 6, a rear wall 8 parallel to the front wall, and two side walls 10 substantially parallel to each other. Housing 4 has an open top and an open bottom and may be made of steel, high-temperature resistant plastic or other suitable material. The lower, tapered portions of the front and rear walls 6, 8 have aligned holes or passageways 12 that receive and support a bolt or pivot axle 14, which defines the primary pivot axis of the mechanism. Each of the front and rear walls 6, 8 also has an arcuate slot 16, and those slots are aligned and serve as guides for other pivoted parts of the mechanism, as described below. The upper third of each wall 6, 8 has a central bulge 18 in which an upper shaft bearing (not shown) is firmly seated.

Referring to FIGS. 4-7, external mechanism 2 comprises first and second clamping assemblies or members 20, 30 that overlap at the center of the housing 4, where they are pivotally attached to one another and to the housing by bolt 14. Clamping assembly 20 comprises upstanding parallel plates 21 and a depending bracket 22 all welded to a clamping bar 24. Two mold-engaging pins 26 depend from clamping bar 24. A thumbscrew 28 threaded into bracket 22 can be tightened against one mold section when the pins are fully inserted therein. Similarly, clamping assembly 30 comprises upstanding parallel plates 31 and a depending bracket 32 all welded to a clamping bar 34. Two mold-engaging pins 36 depend from clamping bar 34. A thumbscrew 38 threaded into bracket 32 can be tightened against the other mold section when the pins are fully inserted therein. Ears 27, 37 at the respective upper outer corners of plates 21, 31 are linked by respective bolts 29, 39 to an internal mechanism 40, disposed in housing 4, that effects relative pivoting movement of the clamping assemblies 20, 30 about bolt 14. Bolts 29, 39 are constrained by slots 16 to move along an arcuate path.

Figure 8:
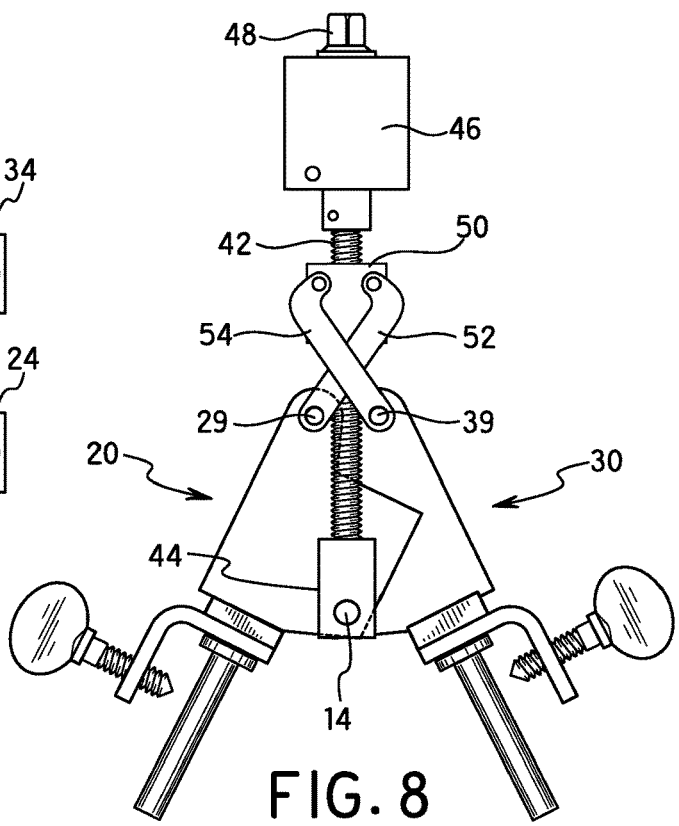
FIG. 8 is a rear elevational view thereof similar to FIG. 4 but shown in the mold-open position.
Figure 9:
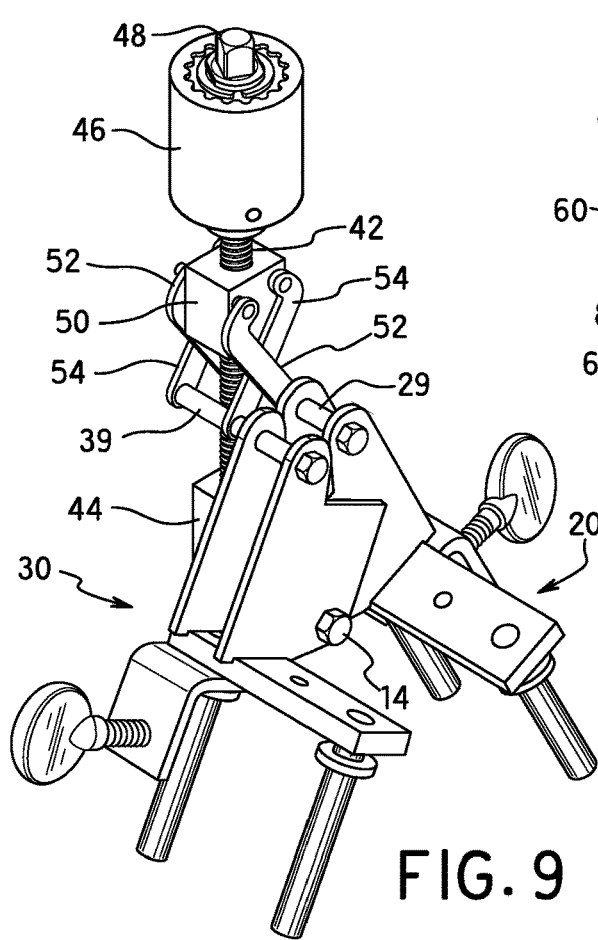
FIG. 9 is a front perspective view similar to FIG. 5 but shown in the mold-open position.
Figure 10:
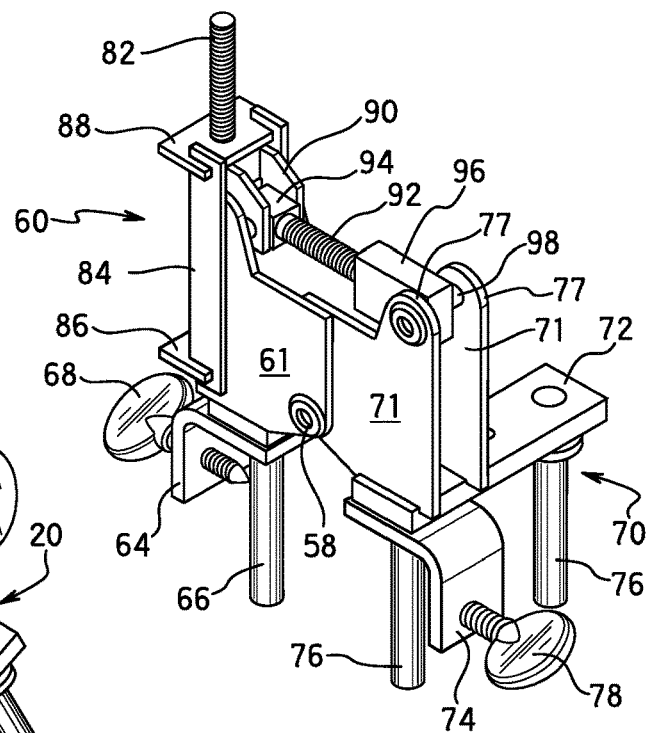
FIG. 10 is a front perspective view of a second embodiment of the mold clamping system of the invention shown in the mold-closed position.
Figure 11:
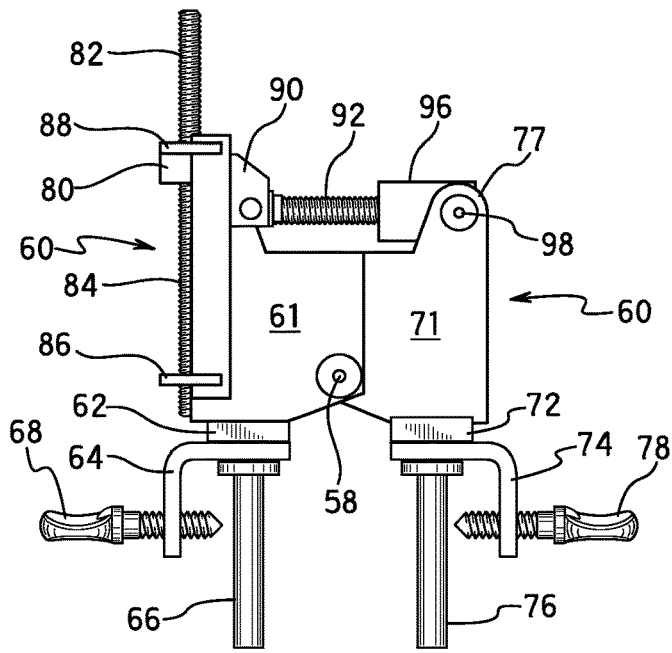
FIG. 11 is a front elevational view thereof.
Figure 12:
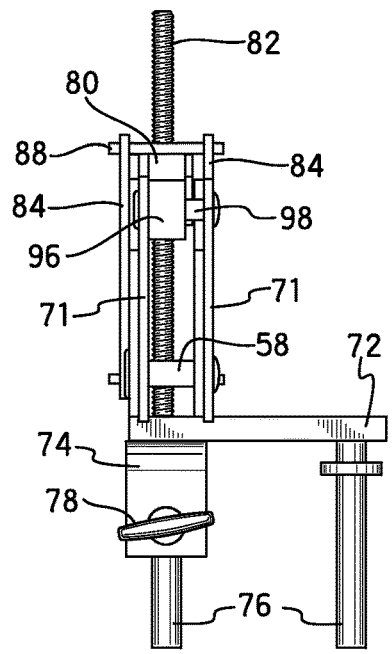
FIG. 12 is a right side elevational view thereof.
Figure 13:
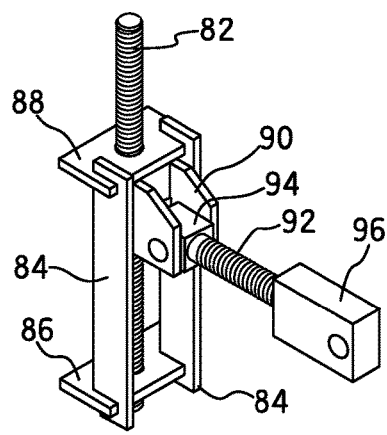
FIG. 13 is a front perspective view of portions of the system shown in the mold-closed position.
Figure 14:
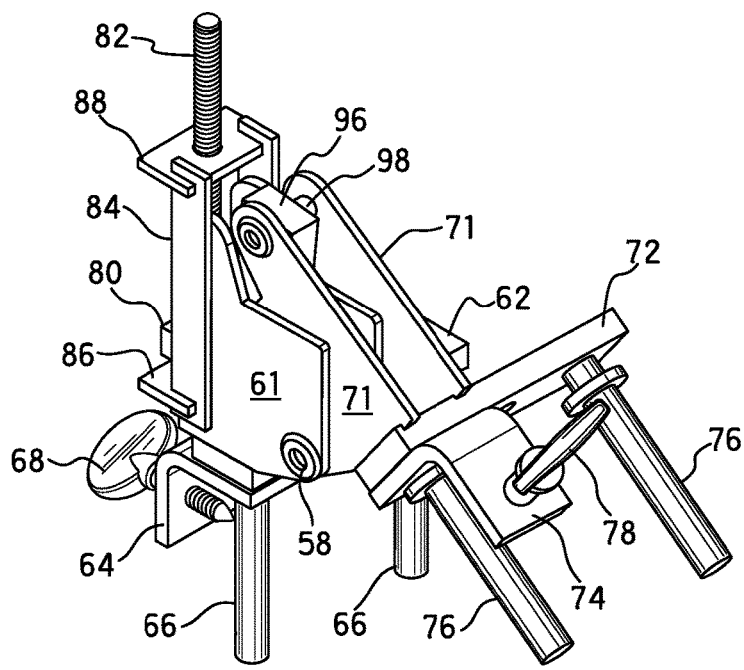
FIG. 14 is a front perspective view thereof shown in the mold-open position.
Figure 15:
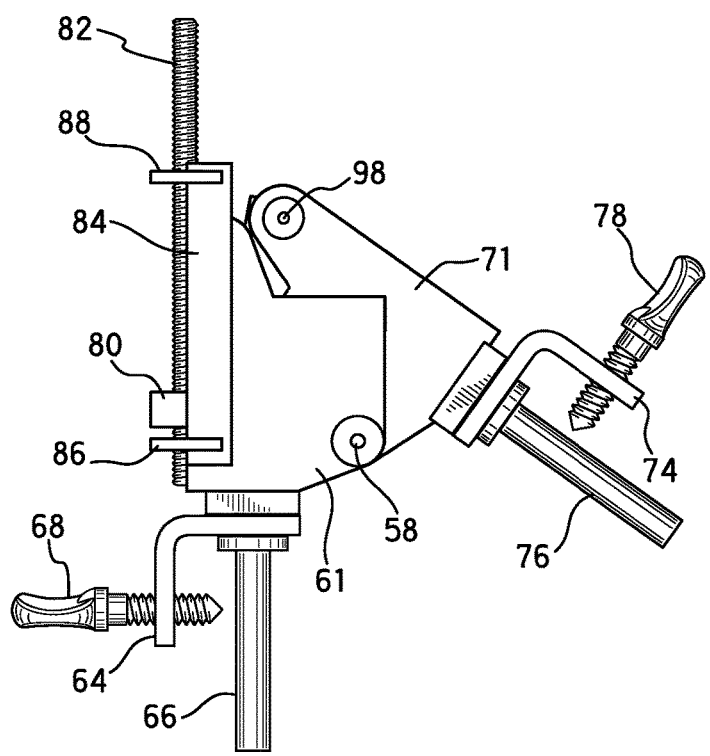
FIG. 15 is a front elevational view thereof shown in the mold-open position.
Figure 16:
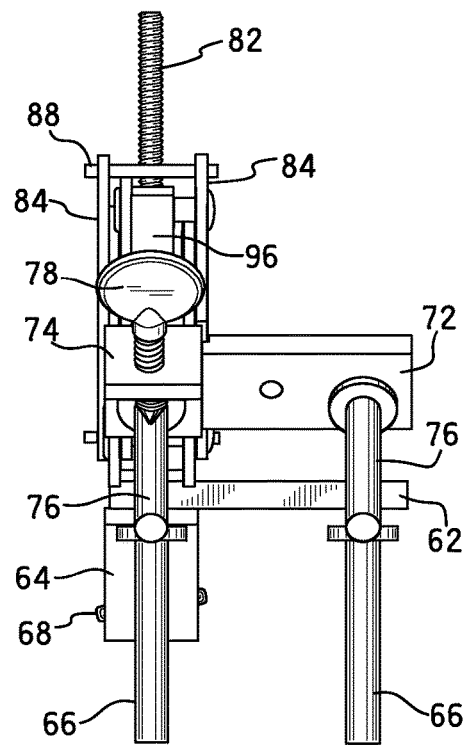
FIG. 16 is a right side elevational view thereof shown in the mold-open position.
Figure 17:
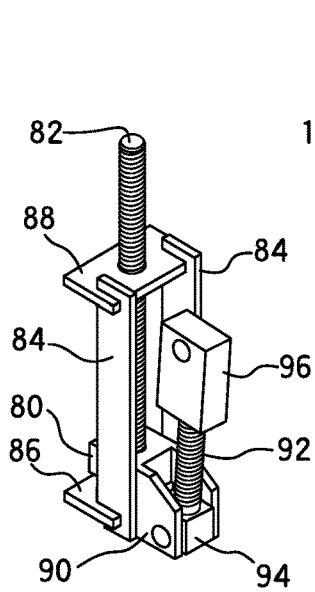
FIG. 17 is a perspective view similar to FIG. 13 of portions of the system shown in the mold-open position.

Internal mechanism 40 comprises a vertical rotatable drive screw 42 rotatable in a lower captive shaft bearing 44, which is anchored translationally but pivotally to housing 4 via bolt 14. A torque limiter 46 at the upper end of screw 42 is surrounded by the upper shaft bearing (not shown), which is firmly seated between housing walls 6, 8 in central bulges 18. The drive head 48 of torque limiter 46 is depicted as square; however, any type of drive head (hexagonal, Torx, etc.) would be suitable if compatible with a chuck, socket or other drive of an electric drill or other rotary power source. A traveling threaded nut 50 disposed along drive screw 42 converts rotary motion of the drive screw into linear vertical motion. Two links 52 are pivotally connected to traveling nut 50 and to bolt 29. Similarly, two links 54 are pivotally connected to traveling nut 50 and to bolt 39. Links 52, 54, guided by arcuate slots 16, thus convert the linear motion of traveling nut 50 to pivoting motion of clamping assemblies 20, 30 about bolt 14 to close and open the clamped mold sections between first and second positions. Compare FIGS. 4 and 5 (mold-closed position) to FIGS. 8 and 9 (mold-open position). To facilitate handling, the drill or other power tool can be releasably attached to housing 4 by a releasable strap 56 or other suitable fastening arrangement coupled to the housing as seen in FIG. 1.

Second Embodiment

FIGS. 10-17

The second embodiment also utilizes two overlapping, pivoted clamping assemblies; however, it has an offset (rather than a central) drive screw, has a single link (instead of four) for controlling relative motion of the clamping assemblies, and is shown without a housing, which is optional. If a housing is incorporated, it may be made of steel, high-temperature resistant plastic or other suitable material. Referring to FIGS. 10-13, the first and second clamping assemblies or members 60, 70 are pivotally joined to each other by a pin or bolt 58, which passes through holes in each assembly's parallel plates 61, 71 and acts as a pivot axle. Each assembly also has a clamping bar 64, 74, a bracket 62, 72, a thumbscrew 68, 78 and two mold-engaging pins 66, 76. A vertical drive screw 82 is carried by clamping assembly 60 in a frame 84 welded to plates 61. Frame 84 includes a bottom plate 86 and a top plate 88, each of which has a clearance hole for drive screw 82. A traveling internally threaded nut 80, welded to a bracket 90, surrounds drive screw 82 and moves between plates 86 and 88 when the drive screw is rotated by a power source connected to its upper end.

A single link, which includes a threaded rod 92, adjustably interconnects bracket 90 and plates 71. One end of rod 92 is rotatably retained in a captive bearing block 94, which is pivotally attached to bracket 90. The other end of rod 92 is threaded in a captive bearing 96, which is pivotally attached by a pin or bolt 98 to ears 77 of plates 71. The effective length of the link thus can be varied through manual rotation of rod 92 in either direction, which is useful for precisely setting the mold-closed position of the clamping assemblies. An alternate embodiment lacking such adjustment could instead use a single, unthreaded member to pivotally interconnect bracket 90 and ears 77.

As can be seen by comparing FIGS. 10-13 (mold-closed position) to FIGS. 14-17 (mold-open position), drive screw 82 is constrained by the multi-link geometry to remain in a substantially fixed vertical position relative to first clamping assembly 60. As drive screw 82 is rotated to open the clamped mold sections, nut 80 travels downward, rotating the second clamping assembly 70 about pin 58 toward frame 84. Reverse rotation of drive screw 82 moves traveling nut 80 upward, rotating the second clamping assembly away from frame 84 and closing the clamped mold sections. To facilitate handling, the rotary power source can be mounted to first clamping assembly 60 by one or more straps, a bracket or another fastening suitable arrangement (not shown), but similar to strap 56 in FIG. 1.

Third Embodiment

FIGS. 18-22

The third embodiment is designed to open and close two mold sections or portions in linear fashion, rather than pivotally, and is intended for use with a jig (not shown) that typically has a base and an upright post, such as the jig disclosed in U.S. Pat. No. 5,660,317. The jig fixedly supports a lower mold section on or near the base and movably supports an upper mold section above the lower one.

Figure 18:
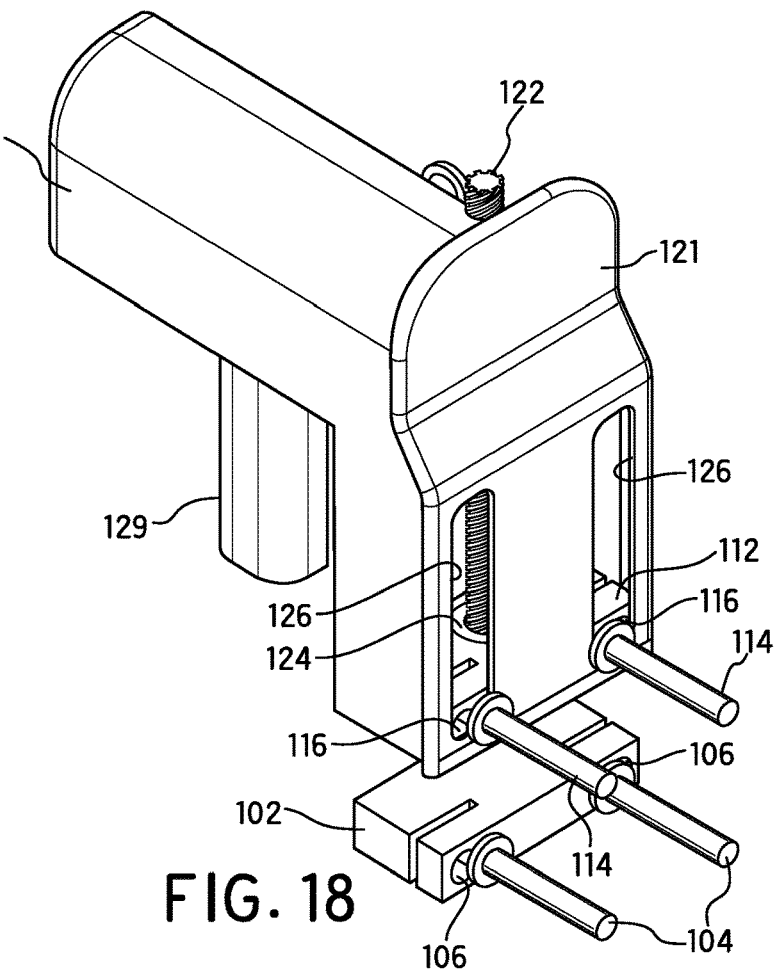
FIG. 18 is a perspective view of a third embodiment of the mold clamping system of the invention taken from the front and the right side thereof and shown in the mold-closed position.
Figure 19:
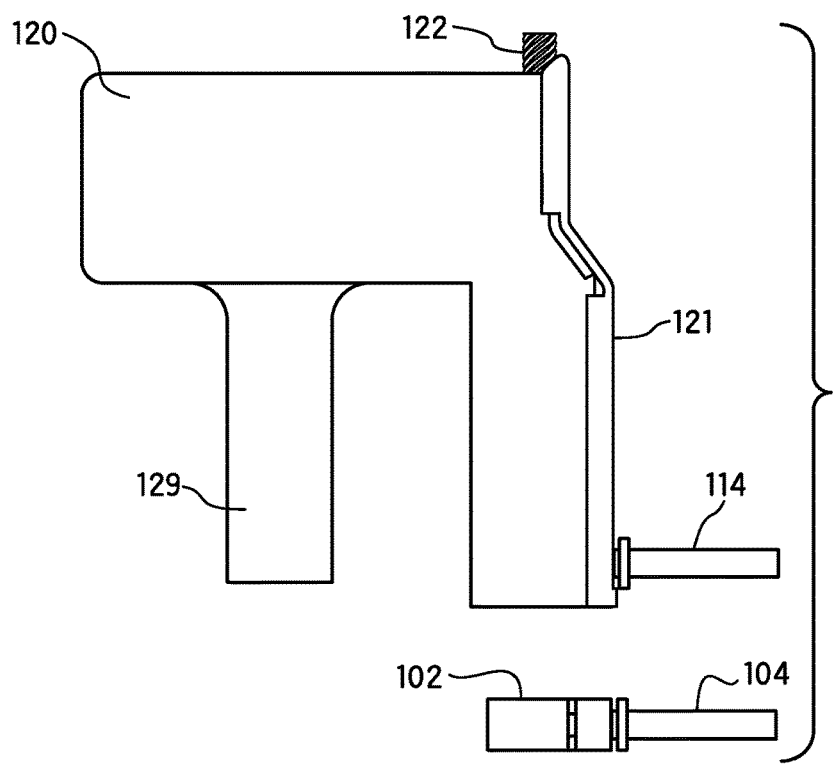
FIG. 19 is a right side elevational view thereof.
Figure 20:
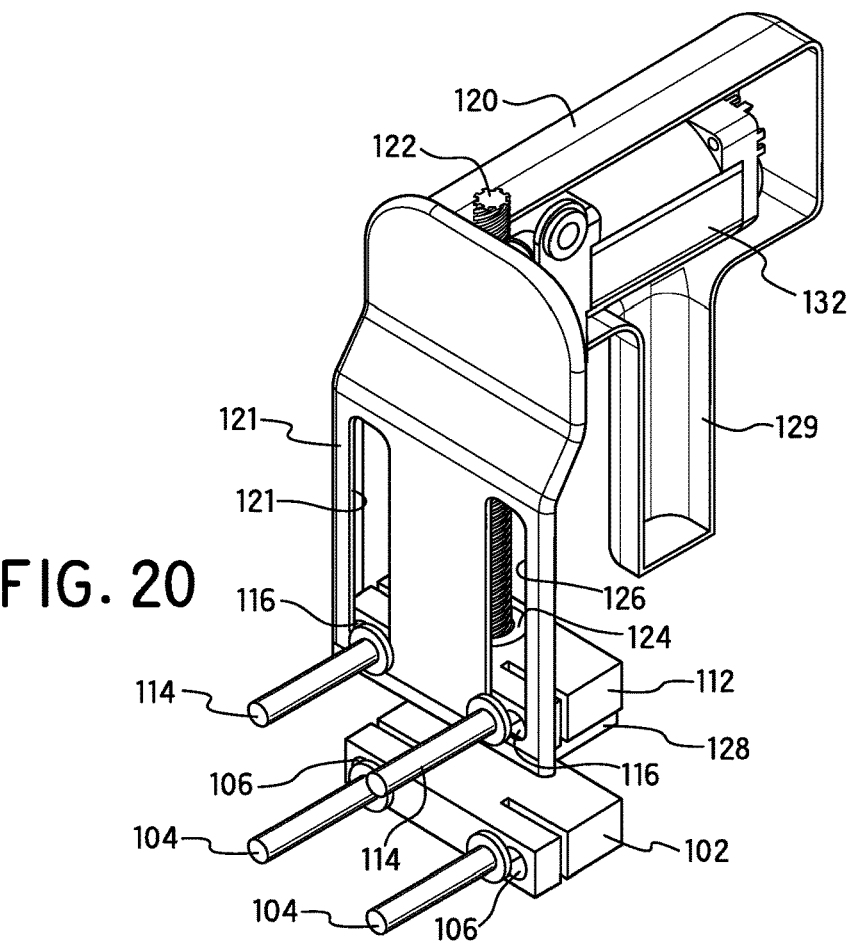
FIG. 20 is a perspective view thereof taken from the front and the left side with the left half of its housing removed to reveal inner details.

Referring to FIGS. 18-22, a jig-mounted lower pin block 102 having two mold-engaging pins 104 forms the fixed support for the lower mold section. In one arrangement, the lower mold section is internally retained by a ball detent on each pin 104 (not shown) or by an equivalent mechanism. In another arrangement, the lower mold section is retained on pins 104 by brackets and thumbscrews (not shown) carried by pin block 102, similar to the arrangements of the previous embodiments. A ball detent (not shown) removably retains each pin 104 in a respective hole 106 of pin block 102. As shown in FIGS. 18, 20 and 22, holes 106 preferably are formed as an inner pair and an outer pair to enable selective mating of the pins with molds having different hole spacings.

An upper pin block 112 having two mold-engaging pins 114 forms the movable support for the upper mold section and acts as a traveling nut to open and close the mold sections. In use, the motorized housing 120 from which pins 114 extend would be adjustably secured to the upright post of the jig by a suitably shaped mounting bracket and/or one or more straps, or by another suitable fastening arrangement (not shown). The upper mold section preferably is internally retained by a ball detent on each pin 114 (not shown) or by an equivalent mechanism. A ball detent (not shown) removably retains each pin 114 in a respective hole 116 of pin block 112. As shown in FIGS. 18, 20 and 22, holes 116 preferably are formed as an inner pair and an outer pair to enable selective mating of the pins with molds having different hole spacings.

Figure 21:
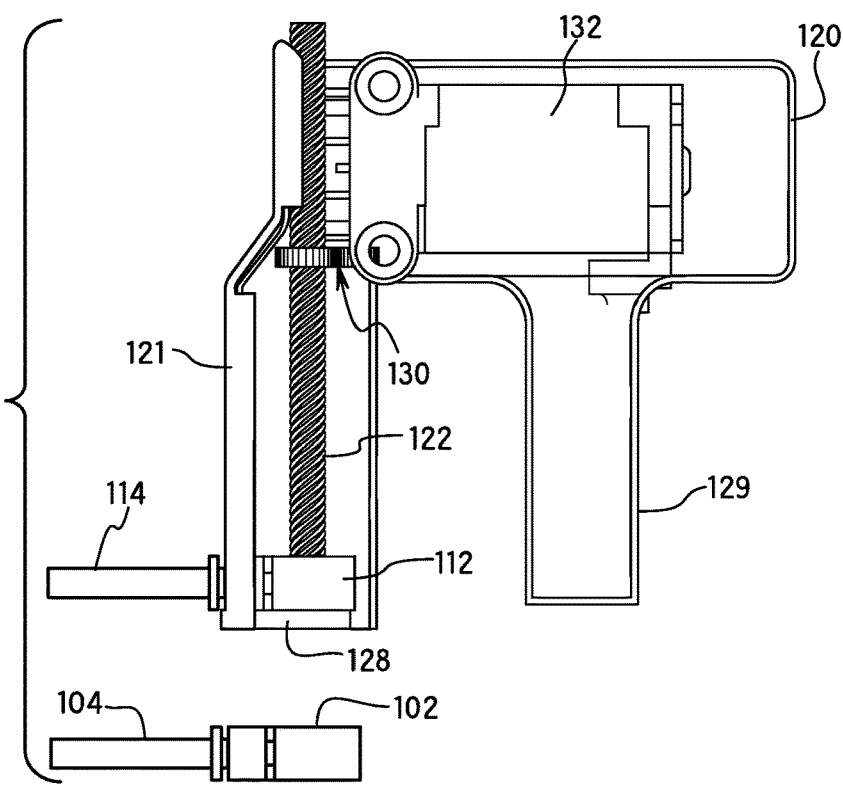
FIG. 21 is a left side elevational view thereof.
Figure 25:
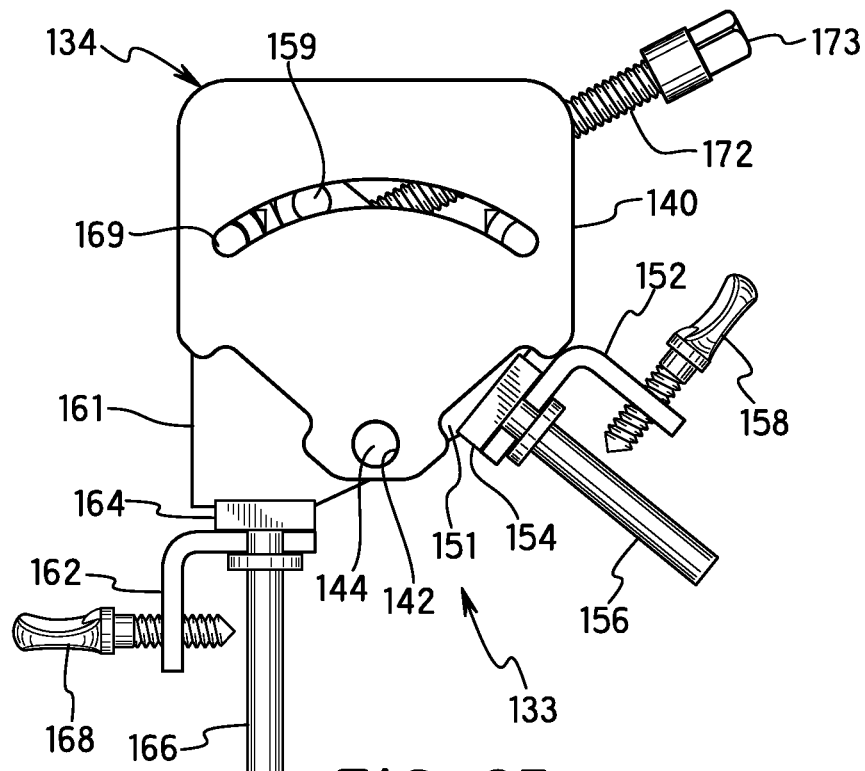
FIG. 25 is a rear elevational view thereof shown in the mold-open position.
Figure 26:
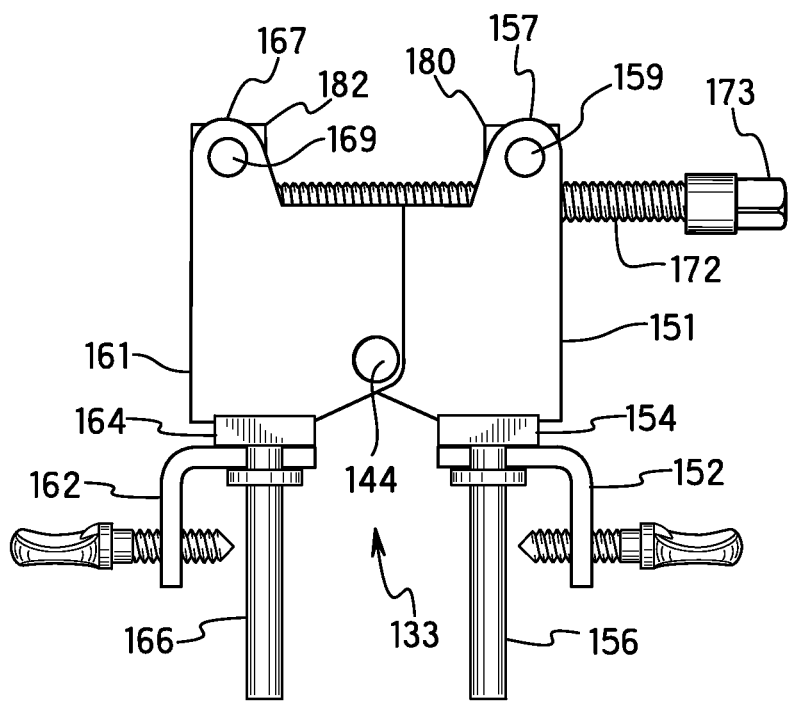
FIG. 26 is a rear elevational view thereof similar to FIG. 23 but shown without its exterior housing.
Figure 27:
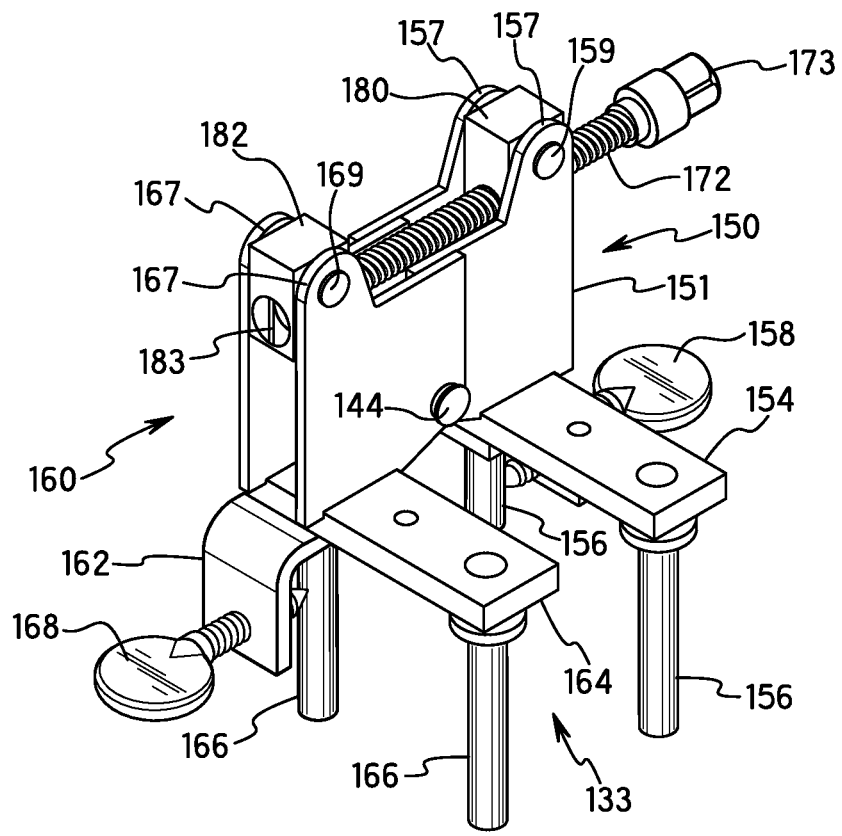
FIG. 27 is a front perspective thereof without the housing and in the mold-closed position.
Figure 28:
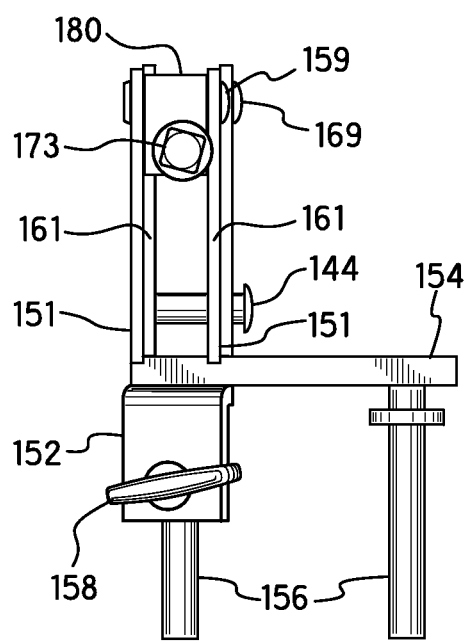
FIG. 28 is a right side elevational view thereof without the housing.
Figure 29:
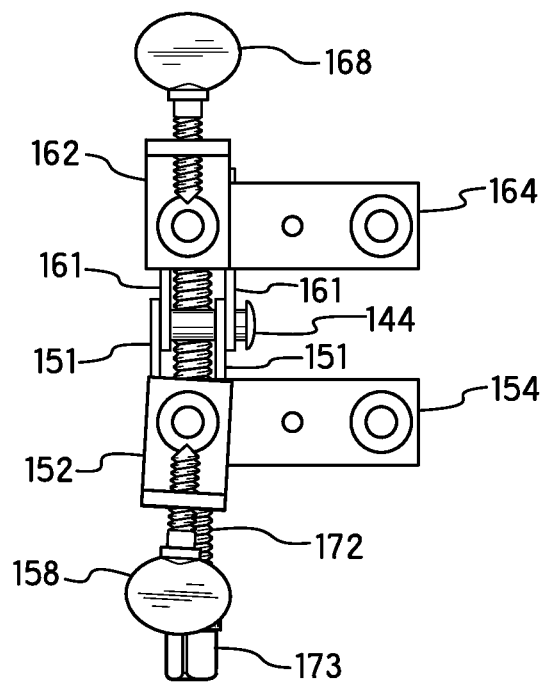
FIG. 29 is a bottom plan view thereof without the housing.

Referring to FIGS. 18, 20 and 21, a vertical drive screw 122 in housing 120 is rotatable within a threaded collar 124 retained in upper pin block 112. The front 121 of housing 120 has two vertical slots 126 through which pins 114 extend and thus define the upper and lower limits of movement of upper pin block 112. The bottom of the housing has a base plate 128 that serves as a stop for upper pin block 112 and for the bottom end of drive screw 122. An upper thrust bearing (not shown) keeps the shaft vertical and prevents it from rising during rotation. A handle 129 facilitates manipulation of the unit when not supported on a jig. Housing 120 may be made of steel, high-temperature resistant plastic or other suitable material and optionally may have a heat dissipating front face that shields the housing from the heat of the exothermic reaction within the mold.

Drive screw 122 is rotated by a gear train 130 driven by an electric motor 132. Alternatively, motor torque could be applied to the drive screw through a belt and pulley drive, a chain and sprocket drive or any other suitable arrangement. Screw rotation in one direction causes upper pin block 112 to rise and thus open the mold. Screw rotation in the opposite direction causes pin block 112 to descend and thus close the mold.

Fourth Embodiment

FIGS. 23-31

Referring to FIGS. 23-26, a fourth embodiment of the invention includes a mechanism 133, which is held in place by two blocks 180, 182 that pivot with relative movement of the threaded rod or screw 172. The threaded rod 172 changes angles relative to its position between the closed and open positions. The mechanism is disposed inside of the upstanding parallel plates 151, 161 that compose the halves of the clamp and supported by a four-sided housing 134, preferably made of steel, having a front wall 136, a rear wall 138 parallel to the front wall, and two side walls 140 substantially parallel to each other. Housing 134 has an open top and an open bottom and may be made of steel, high-temperature plastic resistant or other suitable material. The lower, tapered portions of the front and rear walls 136, 138 have aligned holes 142 that receive and support a bolt of pivot axle 144, which defines the primary pivot axis of the mechanism. Each of the front and rear walls 136, 138 also has an arcuate slot 146, and those slots are aligned and serve as guides for other pivoted parts of the mechanism, as described below.

Referring to FIGS. 26-29), internal mechanism 133 comprises first and second clamping assemblies or members 150, 160 that overlap at the center of the housing 134, where they are pivotally attached to one another and to the housing by bolt or pivot axle 144, or rivet or other suitable method of fastening. Clamping assembly 150 comprises upstanding parallel plates 151 and a depending bracket 152 all welded to a clamping bar 154. Two mold-engaging pins 156 depend from clamping bar 154. A thumbscrew 158 threaded into bracket 152 can be tightened against one mold section when the pins are fully inserted therein. Similarly, clamping assembly 160 comprises upstanding parallel plates 161 and depending bracket 162 all welded to a clamping bar 164. Two mold-engaging pins 166 depend from clamping bar 164. A thumbscrew 168 threaded into bracket 162 can be tightened against the other mold section when the pins are fully inserted therein. Ears 157, 167 at the respective upper outer corners of plates 151, 161 are linked by respective bolts 159, 169 to an internal mechanism 170, disposed in housing 134, that effects relative pivoting movement of the clamping assemblies 150, 160 about bolt 144. Bolts 159, 169 are received in and constrained by slots 146 to move along an arcuate path.

Figure 30:
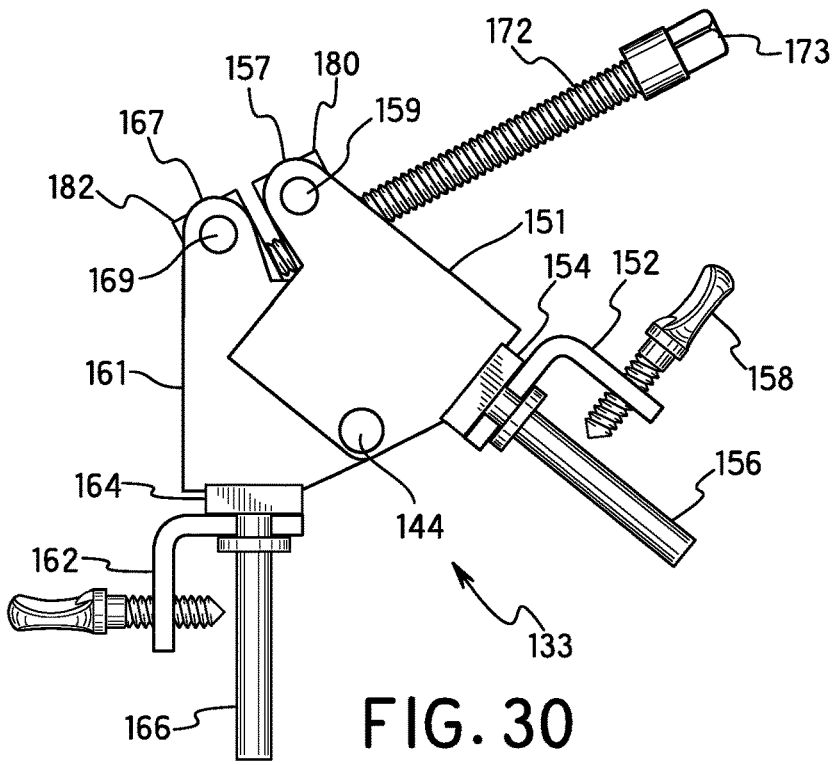
FIG. 30 is a rear elevational view thereof similar to FIG. 26 but shown in the mold-open position.
Figure 31:
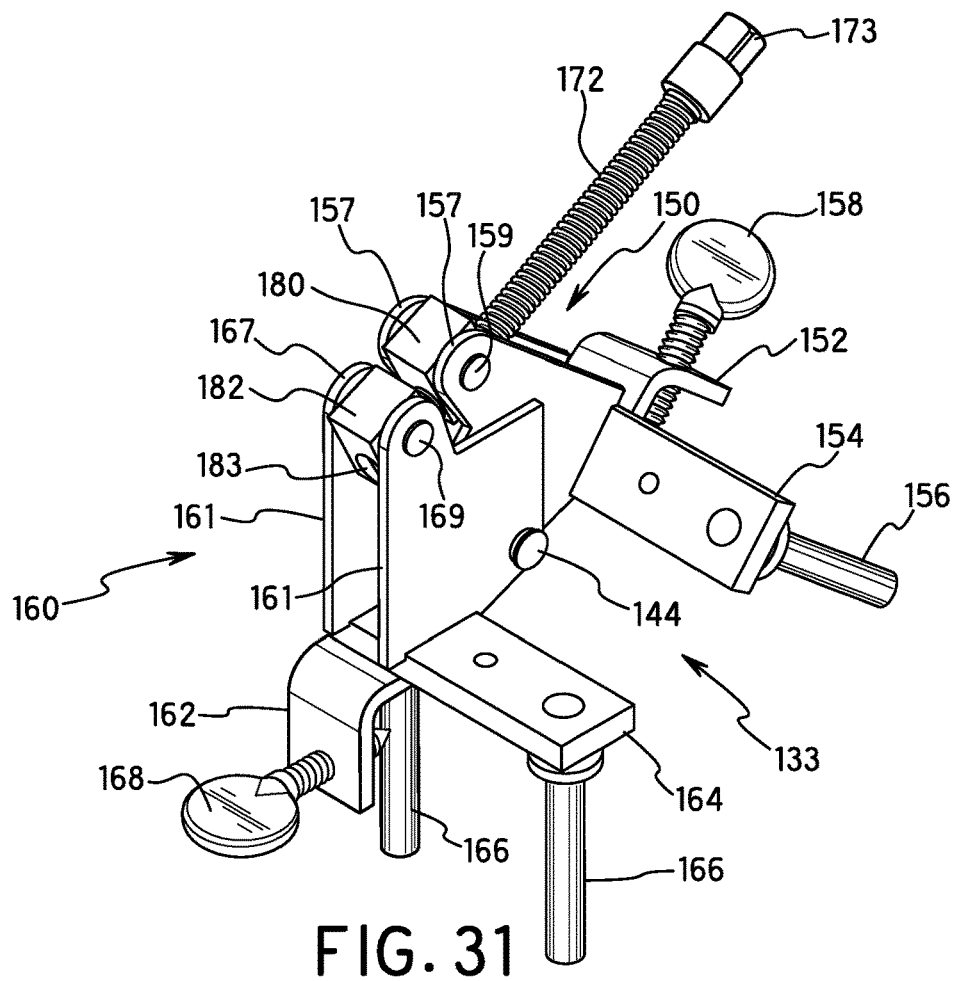
FIG. 31 is a front perspective view similar to FIG. 27 but shown in the mold-open position.

Internal mechanism 170 comprises a drive screw 172 rotatable in threaded block or traveling nut 180 which acts against a captive shaft bearing 174 which is translationally but pivotally anchored via bolt 169 and has a pin stop 183 thereon. A torque limiter (not shown) is located at the upper end of screw 172. The drive head 173 of drive screw 172 is depicted as square; however, any type of drive head (hexagonal, Torx, etc.) would be suitable if compatible with a chuck, socket or other drive of an electric drill or other rotary power source. Threaded block 180 acts as a traveling nut disposed along drive screw 172 and converts rotary motion of the drive screw into pivotal motion of clamp members 150 and 160. Block 180 is pivotally connected to ear holes via bolt 159; through block 182 having a captive shaft bearing 174 therein is pivotally connected to ear holes via bolt 169 and acts as a captive bearing for the end of screw 172. The linear motion of block 180 on drive screw 172 causes pivoting motion of the clamping assemblies 150, 160 about bolt 144 to close and open the clamp mold sections. Compare FIGS. 26 and 27 (mold-closed position) to FIGS. 30 and 31 (mold-open position). To facilitate handling, the drill or other power tool can be attached to housing 134 by a strap or other suitable fastening arrangement.

While exemplary embodiments have been chosen to illustrate the invention, it will be understood by those skilled in the art that various changes, modifications, additions, and substitutions are possible, without departing from the scope and spirit of the invention and the appended patent claims.

What is claimed is:

1. A mold clamping system for exothermic reaction welding adapted to be power-operated by a power device, the system comprising:
   a housing having a front wall with an arcuate shaped guide slot;
   a first member adapted to support a first mold portion;
   a second member adapted to support a second mold portion, said first member and said second member being pivotally coupled together by a pivot axle extending through said front wall and coupled to said housing forming a fixed pivot axis for said first member and second member; and
   a drive mechanism, adapted to be coupled to a power device, coupled to said first and second members and capable of moving said first and second members between a first position, in which said first and second mold portions are spaced apart, and a second position, in which said first and second mold portions are engaged, upon actuation of the power device in a first and a second direction, respectively, said drive mechanism having a threaded drive screw and a traveling threaded nut within said housing, a first link in said housing and having a first end pivotally coupled to said traveling threaded nut and a second end pivotally coupled to said first member by a first pivot bolt extending through said guide slot, and a second link in said housing and having a first end coupled to said traveling threaded nut and a second end pivotally coupled to said second member by a second pivot bolt extending through said guide slot, wherein said guide slot guides said first and second pivot bolts in an arcuate path.

2. The mold clamping system according to claim 1, wherein
   said drive mechanism further comprises a captive shaft bearing in said housing receiving an end of said threaded drive screw, and said threaded nut rotatably engaged with said threaded drive screw.

3. The mold clamping system according to claim 1, wherein
   said drive mechanism further comprises a captive shaft bearing pivotally coupled to said first and second members.

4. The mold clamping system according to claim 3, wherein
   said captive shaft bearing is pivotally coupled to said pivot axle and where said pivot axle is fixed to said housing.

5. The mold clamping system according to claim 1, wherein
   said travelling threaded nut of said drive mechanism further includes a first side facing said first member and a second side facing said second member, said first end of said first link coupled to said first side of said travelling threaded nut and said second end coupled to said second member, and said first end of said second link coupled to said second side of said travelling threaded nut and said second end coupled to said first member.

6. The mold clamping system according to claim 1, wherein
   said drive mechanism further includes a gear train coupled to said drive mechanism.

7. The mold clamping system according to claim 1, and further comprising
   a mechanism for releasably attaching said drive mechanism to a rotary power device.

8. The mold clamping system according to claim 1, and further comprising means for attaching a rotary power device to the mold clamping system.

9. The mold clamping system according to claim 1, wherein
   said drive mechanism comprises a rotary drive mechanism.

10. The mold clamping system according to claim 1, wherein
    said drive mechanism comprises a rotatable screw.

11. A mold clamping system for exothermic reaction welding adapted to be power-operated by a rotary power device, the system comprising:
    a frame having a bottom plate having a clearance hole and a top plate having a clearance hole;
    a first member adapted to support a first mold portion and having a first transverse passageway for receiving a pivot axle therein, said first member fixed to said frame;
    a second member adapted to support a second mold portion and having a second transverse passageway for receiving a pivot axle therein;
    a pivot axle pivotally received in said first and second passageways for pivoting said second member relative to said first member and relative to said frame; and
    a drive mechanism, adapted to be coupled to a rotary power device, coupled to said first and second members and capable of pivoting said first and second members between a first position, in which the first and second mold portions are spaced apart, and a second position, in which the first and second mold portions are engaged, upon actuation of the rotary power device in a first and second rotational direction, respectively, said drive mechanism including a threaded screw extending through said clearance hole of said bottom plate and said top plate and fixed axially with respect to said frame, a threaded nut on said threaded screw in said frame for movement relative to said threaded screw, a link having a first end coupled to said threaded nut and a second end pivotally coupled to said second member.

12. The clamping system of claim 11, wherein a block is fixed to said threaded nut, and where said first end of said link is pivotally connected to said block, said block having a threaded passage, and said link includes threads received in said threaded passage for adjusting the length of said link.

13. The clamping system of claim 12, wherein said first member has a top end at a top end of said frame and a bottom end at a bottom end of said frame, said threaded screw extending between said top end of said frame and said bottom end of said frame where said threaded nut and block travel between said top end of said frame and said bottom end of said frame to pivot said second member relative to said first member.

14. A mold clamping system for exothermic reaction welding adapted to be power-operated by a rotary power device, the system comprising:
    a housing having a front wall with a slot;
    a movable first member in said housing configured to support a first mold portion by a pin extending through said slot, said movable first member having a threaded opening;
    a fixed second member forming a fixed support fixed with respect to said housing and configured to support a second mold portion, said movable first member being movable with respect to said fixed second member and said housing;
    said housing having a fixed base plate in a fixed position relative to said fixed second member and being spaced from said fixed second member, said fixed base plate oriented between said movable first member and said fixed second member, said movable first member being movable relative to said fixed base plate, said fixed base plate forming a stop for said movable first member toward said second member; and
    a drive mechanism in said housing configured to be coupled to a rotary power device, and being coupled to said first member and providing linear movement to said first member relative to said housing and said second member between a first position, in which the movable first member and the first mold portion are spaced apart from said fixed second member and second mold portion, and a second position, in which the movable first member is moved toward said fixed second member and the first and second mold portions are engaged, upon actuation of the rotary power device in a first and second rotational direction, respectively, wherein said drive mechanism includes a rotatable drive screw in said housing extending through said threaded opening in said movable first member.

15. The mold clamping system of claim 14, wherein said threaded opening is formed in a threaded collar of said first member rotatably receiving said drive screw, and an end of said drive screw is rotatably coupled to said fixed base plate.

16. The mold clamping system of claim 14, wherein said drive mechanism includes a gear train coupled to said drive screw to rotate said drive screw.

17. The mold clamping system of claim 14, wherein said movable first member includes a pin block that is rotatably engaged with said drive mechanism, and a gear train coupled to said drive mechanism.

18. The mold clamping system of claim 14, wherein said drive screw has a first end on a first side of said movable member and a second end on a second side of said movable member opposite said first side, and wherein said second end of said drive screw is rotatably coupled to said fixed base plate, and rotation of said drive screw causes said linear movement of said movable first member relative to said fixed base plate and said fixed second member in a direction parallel to an axis of said drive screw between said first position and said second position.

19. The mold clamping system of claim 14, wherein said drive screw has an end rotatably coupled said fixed base plate and where said fixed base plate limits axial movement of said drive screw and limits linear movement of said movable first member.

20. The clamping system of claim 19, wherein said fixed base plate forms an end of said housing, and said movable first member is movable within said housing.

21. The clamping system of claim 20, wherein said pin extends through said slot for supporting the first mold portion.

22. The clamping system of claim 21, where said fixed second member includes a pin configured for supporting the second mold portion.

\* \* \* \* \*